Jan. 31, 1967   B. E. HART   3,302,096

TWO-CORE THREE-COIL TRANSFORMERS

Filed Oct. 12, 1962

INVENTOR
BURT E. HART
BY Roger A. Van Horn
ATTORNEY

United States Patent Office 3,302,096
Patented Jan. 31, 1967

3,302,096
TWO-CORE THREE-COIL TRANSFORMERS
Burt E. Hart, Rockville, Conn., assignor to United Aircraft Corporation, East Hartford, Conn., a corporation of Delaware
Filed Oct. 12, 1962, Ser. No. 230,211
5 Claims. (Cl. 321—45)

My invention relates to a static inverter. More particularly, my invention is directed to a novel transformer arrangement for use in a circuit which converts a direct current voltage into an alternating current voltage of the desired frequency.

The static inverter is a device which produces alternating current from direct current without an operational dependence on relative mechanical motion between component parts. In missile, nautical, and automotive applications it is necessary that the static inverters utilized to provide, from battery sources, the required A.C. output voltages to drive motors and the like be compact, reliable, and light weight. The static inverters employed in the prior art have either utilized complex switching arrangements, which have a tendency toward unreliability due to component failures, or these prior art inverters have used transformer arrangements, which had a plurality of transformers and thus had inherent size and weight limitations. Further, prior art static inverters utilized either double ended drivers or square wave inputs for switching purposes. This, of course, increased the complexity of the circuits and, in the case of the square wave input, required a large transformer with its accompanying large losses.

My invention overcomes the disadvantages of the prior art by providing a novel static inverter.

It is therefore an object of my invention to change a direct current voltage into an alternating current voltage.

It is another object of my invention to provide a novel, reliable, efficient and light weight static inverter.

It is yet another object of my invention to provide a novel transformer for use in a static inverter.

These and other objects of my invention are accomplished by a novel static inverter circuit. The heart of this circuit is a unique output transformer arrangement utilizing either two transformers or a novel single transformer having a pair of cores with a common primary winding wound on both of said cores and two independent secondary windings each wound on one of said cores. The D.C. voltage to be changed to an A.C. voltage is applied, by a pair of switching circuits, to the transformer arrangement in such a manner that current will alternately flow in opposite directions in alternate halves of the primary winding or windings. This alternating current will be coupled to one of the secondary windings and thence to the load circuit.

My invention may be better understood and its numerous advantages will become apparent to those skilled in the art by reference to the accompanying drawing in which like reference numerals apply to like elements in the various figures and in which.

Figure 1:
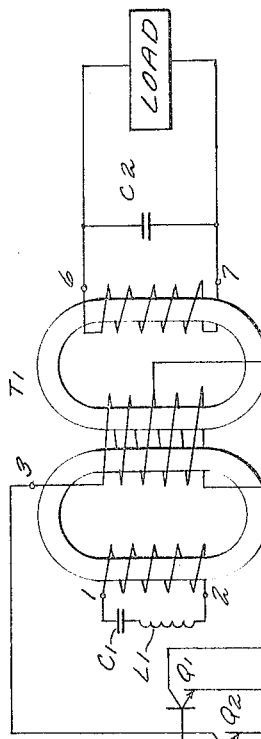
FIGURE 1 shows a static inverter utilizing a novel two-core, three-coil transformer.

Referring now to FIGURE 1, the D.C. voltage which is to be changed is furnished by a direct current source 10. The negative terminal of source 10 is connected to the emitter electrodes of a pair of transistor switches Q1 and Q2. The positive terminal of source 10 is applied to the center tap of the primary winding 3, 4, 5 of a two-core, three-coil transformer T1. The end terminals 3, 4 of the primary winding of transformer T1 are respectively connected to the collector electrodes of transistor switches Q2 and Q1. Control pulses are supplied to the base electrodes of switches Q1 and Q2 by a circuit comprised of a free running Clapp oscillator 12, diode switch 14 and a push-pull driver stage 16. Oscillator 12 supplies a sine wave at the desired frequency which, in the case of aeronautical applications, is generally 400 cps. Diode switch 14 converts the sine wave from oscillator 12 to a series of pulses which are supplied to push-pull driver 16. Driver 16, in a manner well known in the art, supplies the switching pulses alternately to switches Q1 and Q2. When switch Q1 is closed by a pulse from driver 16, current will flow from D.C. source 10 through the lower half of the center tapped primary winding, through the switch and back to the source. When an alternate pulse is received from driver 16 switch Q1 will be open and switch Q2 will be closed thereby permitting current flow through the upper half of the center-tapped primary winding. Thus, alternating current will flow in the primary winding of transformer T1 at a frequency determined by the frequency at which switches Q1 and Q3 are alternately closed.

Figure 2:
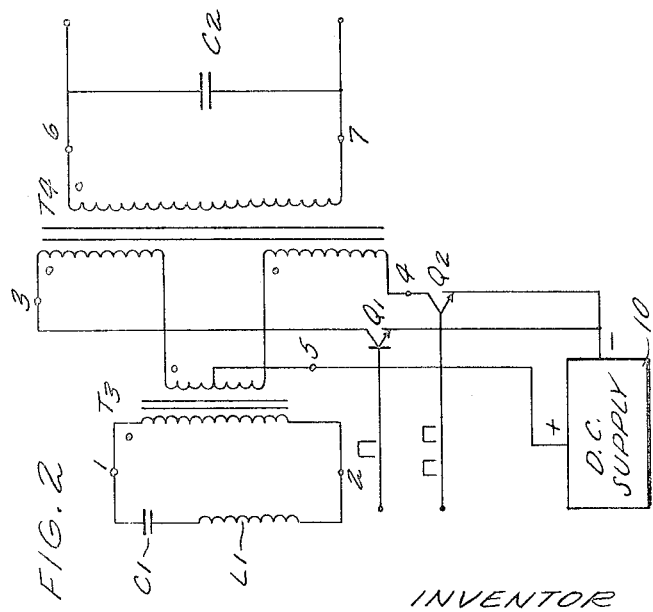
FIGURE 2 is an equivalent transformer arrangement to that shown in FIGURE 1 wherein a pair of transformers are utilized.

The two-core, three-coil transformer T1 behaves like the two transformer arrangement illustrated in FIGURE 2. The secondary load impedances placed across the two secondary winding coils 1, 2 and 6, 7 are reflected back to the primary winding in series. This effect is accomplished by transformer T1 by placing the two cores through a common primary winding 3, 4, 5 and placing an independent secondary winding on each of these cores. The primary winding sees the sum of the flux linkages due to both cores while the secondary windings see only the flux linkages of their respective cores. The impedance measured across the primary winding will thus be the sum of the impedances reflected by the two secondary windings. Therefore, by connecting a series resonant circuit consisting of capacitor C1 and inductor L1 across secondary winding 1, 2, an impedance will be reflected to the primary winding 3, 4, 5 such that this winding will pass only current at the desired frequency. Also, by connecting a capacitor C2 across secondary winding 6, 7, a parallel resonant circuit is created. The load is connected across this parallel resonant circuit. Thus, only an A.C. voltage of the desired frequency will be induced in secondary winding 6, 7 and will appear across the load.

As stated above, the two transformer arrangement of FIGURE 2, consisting of transformers T3 and T4 is electrically equivalent to and operates in the same manner as the two-core, three-coil transformer of FIGURE 1. Thus the arrangement of FIGURE 2 may be used in place of that of FIGURE 1 in situations where the size and weight limitations are not critical. However, by use of the two-core three-coil transformer of FIGURE 1, a 30% savings in weight may be realized.

The advantages of my novel static inverter and novel two-core three-coil transformer will be readily apparent to those skilled in the art. Not only does my arrangement offer simplicity, reliability, and savings in weight and size, but it also permits use of a single polarity input. That is, my invention offers an improvement over the prior art in that neither a double ended driver nor a square wave input are required. Thus, while a preferred embodiment has been shown and described, various modifications and substitutions may be made without deviating from the scope and spirit of my invention. My invention is, therefore, described by way of illustration rather than limitation and accordingly it is understood that my invention is to be limited only by the appended claims taken in view of the prior art.

I claim:
1. Apparatus for converting a direct current to an alternating current comprising:

a pair of current switching devices each having a pair of terminals and a control element, means for generating switching control signals, means for alternately applying said switching control signals to the said control elements of said devices to alternately close said switching devices, a source of direct current, means electrically connected a first polarity terminal of said source to a first terminal of each of said switching devices, a two-core three-coil transformer having a common center tapped primary winding encompassing both cores and a pair of independent secondary windings each wound on a separate one of said cores, means electrically connecting the center tap of said primary winding to the second and opposite polarity terminal of said source, means connecting the opposite ends of said primary winding to the other terminal on respective switching devices whereby current will flow through said primary winding in opposite directions in response to the alternate closing of said switching devices, a series resonant circuit, means connecting said series resonant circuit across a first of said secondary windings whereby the impedance of said circuit is reflected to said primary winding, a capacitive element, means connecting said capacitive element across the second of said secondary windings whereby said capacitive element and its associated winding will form a parallel resonant circuit, and means for connecting a load across said parallel resonant circuit.

2. The apparatus of claim 1 wherein said switching devices comprise:

first and second transistors having their collector electrodes respectively connected to opposite ends of said primary winding and having their emitter electrodes connected to said first polarity terminal of said source.

3. Apparatus for converting a direct current to an alternating current comprising:

a pair of current switching devices each having a pair of terminals and a control element, means for generating switching control signals, means for alternately applying said switching control signals to the control elements of said devices so as to permit current to alternately flow therethrough, a source of direct current, means electrically connecting a first polarity terminal of said source to a first terminal of each of said switching devices, transformer means having at least a center tapped primary winding and a pair of secondary windings for coupling the second and opposite polarity terminal of said source to the other terminal of each of said switching devices, the ends of said primary winding being connected to respective switching devices and the center tap of said primary winding being connected to said source whereby the alternate closing of said switching devices causes current to alternately flow in opposite directions through the center tapped primary winding of said transformer means, a series resonant circuit, means connecting said series resonant circuit across a first one of said secondary windings of said transformer means, means for connecting a load across the other of said secondary windings of said transformer means, and means connected in parallel with said load connecting means for forming a parallel resonant circuit thereacross.

4. Apparatus for converting a direct current to an alternating comprising:

a pair of current switching devices, means for generating switching control signals, means for alternately applying said switching control signals to said switching devices to control the alternate closing thereof, a source of direct current, means electrically connecting a first terminal of said switching means to a first polarity terminal of said source, a first transformer having a secondary winding and a center tapped primary winding, a second transformer having a pair of primary windings and a secondary winding, means connecting the center tap of the primary winding of said first transformer to the second and opposite polarity terminal of said source, means connecting an end of each of the pair of primary windings on the second transformer to a respective end of the center tapped primary winding of said first transformer thereby forming a single common primary winding consisting of a series connection of the three indepedent primary windings, means connecting the other end of said primary windings of said second transformer to the other terminals of respective switching devices, a series resonant circuit, means connecting said series resonant circuit across the secondary winding of said first transformer, a capacitive element, means connecting said capacitive element across the secondary winding of said second transformer, and means for connecting a load across the parallel resonant circuit formed by said capacitive element and the secondary winding of said second transformer.

5. The apparatus of claim 4 wherein said switching devices comprise:

first and second transistors having their emitter electrodes connected to a first polarity terminal of said source and having their collector electrodes respectively connected to ends of said primary windings of said second transformer.

References Cited by the Examiner

UNITED STATES PATENTS

| | | | |
|---|---|---|---|
| 2,516,563 | 7/1950 | Graves | 321—43 |
| 2,774,878 | 12/1956 | Jensen | 321—44 |
| 2,883,539 | 4/1959 | Bruck et al. | 321—44 |
| 3,008,068 | 11/1961 | Wilting et al. | 321—45 |

JOHN F. COUCH, *Primary Examiner.*

LLOYD McCOLLUM, *Examiner.*

J. M. THOMSON, W. M. SHOOP, *Assistant Examiners.*